(12) United States Patent
Wu et al.

(10) Patent No.: US 9,154,174 B1
(45) Date of Patent: Oct. 6, 2015

(54) SYSTEMS AND METHODS FOR CLOSED-LOOP AND OPEN-LOOP WIRELESS COMMUNICATIONS

(75) Inventors: Jianming Wu, Nepean (CA); Jianglei Ma, Kanata (CA); Wen Tong, Ottawa (CA); Peiying Zhu, Kanata (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 958 days.

(21) Appl. No.: 12/025,179

(22) Filed: Feb. 4, 2008

Related U.S. Application Data

(60) Provisional application No. 60/887,834, filed on Feb. 2, 2007.

(51) Int. Cl.
*H04B 1/00* (2006.01)
*H04B 1/3827* (2015.01)

(52) U.S. Cl.
CPC .................................. *H04B 1/3833* (2013.01)

(58) Field of Classification Search
None
See application file for complete search history.

(56) References Cited

U.S. PATENT DOCUMENTS

| | | | |
|---|---|---|---|
| 8,934,850 B1 | 1/2015 | Wu et al. | |
| 2002/0123337 A1 | 9/2002 | Dharia et al. | |
| 2002/0173302 A1* | 11/2002 | Baker et al. ................ | 455/422 |
| 2004/0077378 A1* | 4/2004 | Kim et al. ................. | 455/562.1 |
| 2005/0181739 A1* | 8/2005 | Krasny et al. .............. | 455/69 |
| 2005/0281221 A1* | 12/2005 | Roh et al. ................... | 370/328 |
| 2006/0035643 A1* | 2/2006 | Vook et al. ................. | 455/450 |
| 2006/0040619 A1* | 2/2006 | Cho et al. ................... | 455/69 |
| 2006/0153112 A1 | 7/2006 | Lim et al. | |
| 2007/0127586 A1* | 6/2007 | Hafeez ........................ | 375/267 |
| 2007/0165576 A1* | 7/2007 | Wang et al. ................. | 370/335 |
| 2008/0080634 A1* | 4/2008 | Kotecha et al. ............. | 375/267 |

OTHER PUBLICATIONS

Advisory Action for U.S. Appl. No. 12/025,190 mailed Jun. 1, 2011, 3 pages.
Final Office Action for U.S. Appl. No. 12/025,190 mailed Feb. 23, 2011, 12 pages.
Non-final Office Action for U.S. Appl. No. 12/025,190 mailed Sep. 16, 2010, 12 pages.
"Advisory Action", U.S. Appl. No. 12/025,190, (Jun. 27, 2012),3 pages.
"Final Office Action", U.S. Appl. No. 12/025,190, (Apr. 18, 2012),12 pages.
"Non-Final Office Action", U.S. Appl. No. 12/025,190, (Jun. 4, 2013), 12 pages.
"Final Office Action", U.S. Appl. No. 12/025,190, Feb. 13, 2014, 14 pages.
"Notice of Allowance", U.S. Appl. No. 12/025,190, Sep. 5, 2014, 4 pages.

\* cited by examiner

*Primary Examiner* — Zhiyu Lu
(74) *Attorney, Agent, or Firm* — Brandon Roper; Judy Yee; Micky Minhas

(57) ABSTRACT

The present invention relates to user equipment (UE) having at least two transmit antennas that are capable of transmitting RF signals to a base station, which selects either an open-loop mode or a closed-loop mode depending on how the RF signals from the UE are changing. In the closed-loop mode, the base station periodically evaluates the RF signals from the UE and selects which of the UE's transmit antennas are to be used. This information is then sent to the UE. If the base station determines that the RF signals from the UE are changing too rapidly for effective control, then the base station selects the open-loop mode, such that the UE selects which of the UE's transmit antennas are to be used.

22 Claims, 12 Drawing Sheets

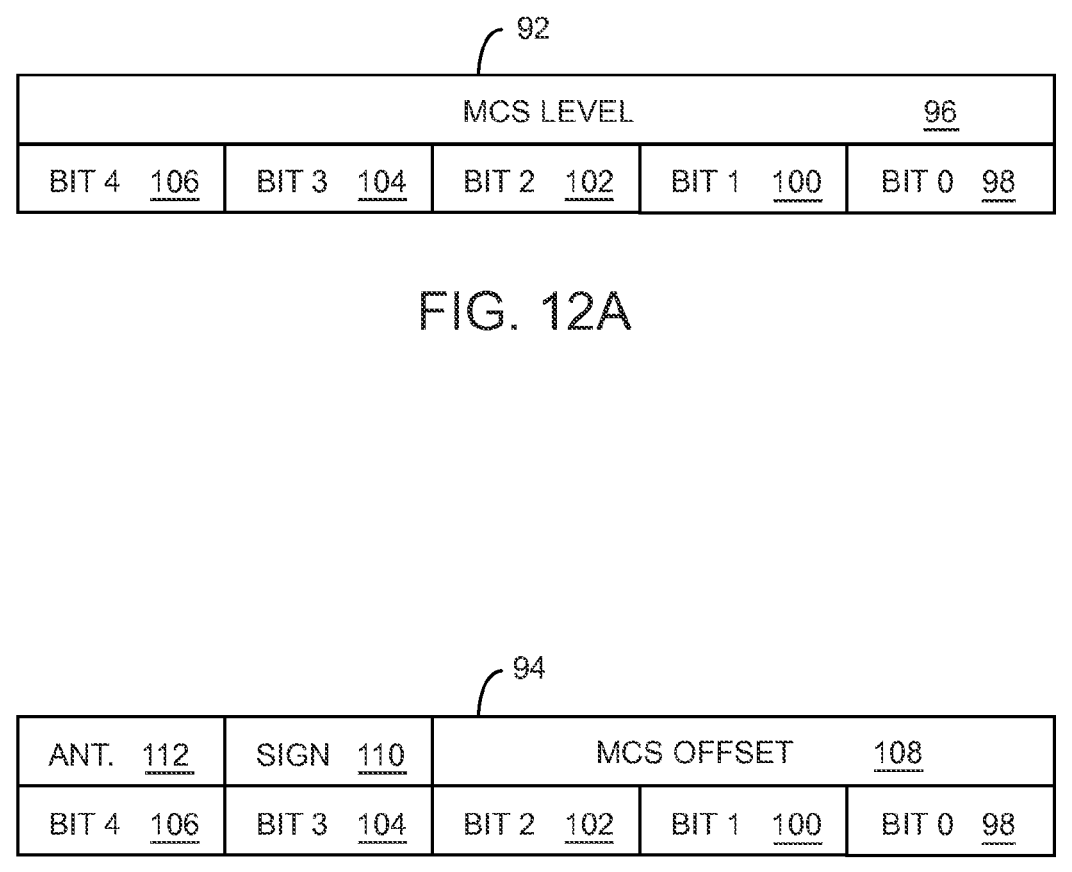

| | | 92 | | |
|---|---|---|---|---|
| | | MCS LEVEL | | 96 |
| BIT 4  106 | BIT 3  104 | BIT 2  102 | BIT 1  100 | BIT 0  98 |

FIG. 12A

| | | 94 | | |
|---|---|---|---|---|
| ANT.  112 | SIGN  110 | MCS OFFSET | | 108 |
| BIT 4  106 | BIT 3  104 | BIT 2  102 | BIT 1  100 | BIT 0  98 |

FIG. 12B

SYSTEMS AND METHODS FOR CLOSED-LOOP AND OPEN-LOOP WIRELESS COMMUNICATIONS

RELATED APPLICATIONS

This application is related to U.S. patent application Ser. No. 12/025,190 entitled SYSTEMS AND METHODS FOR CLOSED-LOOP AND OPEN-LOOP WIRELESS COMMUNICATIONS filed Feb. 4, 2008, which is concurrently filed herewith and incorporated herein by reference in its entirety. Additionally, this application claims the benefit of provisional patent application Ser. No. 60/887,834, filed Feb. 2, 2007, the disclosure of which is hereby incorporated herein by reference in its entirety.

FIELD OF THE INVENTION

Embodiments of the present invention relate to wireless communications systems that utilize user equipment having multiple antennas, and selecting subsets of the multiple antennas depending on conditions associated with transmitting radio frequency (RF) signals from the user equipment.

BACKGROUND OF THE INVENTION

In a communications system, wireless communications links between transmitters and receivers are often affected by multiple factors. RF signals from the transmitters radiate in multiple directions and are reflected by different surfaces at multiple locations. Therefore, the receivers may simultaneously receive RF signals directly from the transmitters without reflections, as well as multiple reflected RF signals, which are referred to as multipath signals. Sometimes a receiver may be blocked from receiving an RF signal directly from a transmitter, wherein the receiver may receive only reflected signals. Such blocking is known as shading. Interfering RF signals may also be transmitted to the receiver directly, indirectly, or both. Movement of the transmitter, the receiver, or both may change these conditions. Interfering RF signals may come and go, and may originate from moving transmitters. As a result, conditions of the wireless communications links are often changing. Notably, changing the location of a transmitter antenna or a receiver antenna may temporarily improve or degrade a communications link.

Some systems may select one or more of multiple transmit antennas, multiple receive antennas, or both to provide spatial diversity in the communications system and improve overall performance. However, the effectiveness of antenna selection may be limited by the ability of the system to quickly measure and respond to changing RF link conditions. Thus, there is a need for a wireless communications system that can measure RF link conditions and select at least one antenna based on the RF link conditions rapidly enough to be effective.

SUMMARY OF THE EMBODIMENTS

The present invention relates to user equipment (UE) having at least two transmit antennas that are capable of transmitting RF signals to a base station, which selects either an open-loop mode or a closed-loop mode depending on how the RF signals from the UE are changing. In the closed-loop mode, the base station periodically evaluates the RF signals from the UE and selects which of the UE's transmit antennas are to be used. This information is then sent to the UE. If the base station determines that the RF signals from the UE are changing too rapidly for effective control, then the base station selects the open-loop mode, such that the UE selects which of the UE's transmit antennas are to be used.

In one embodiment of the present invention, the UE's transmit antennas may also be used as receive antennas. In the open-loop mode, the UE may evaluate RF signals received from the base station as the basis for antenna selection. In the closed-loop mode, the UE may receive antenna selection information from a dedicated control channel, an existing control channel with spare bits, or an alternative bit definition of an existing control channel. The UE may transmit a sounding channel alternating between the UE's transmit antennas. The base station may use reception of the sounding channel from the different antennas as the basis for mode selection, antenna selection, or both. The UE may have a single transmit chain coupled to the transmit antennas through an RF switch to save cost and reduce complexity.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 12A and 12B show details of the standard MCS indication channel and the alternate MCS indication channel, respectively.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to user equipment (UE), having at least two transmit antennas that are capable of transmitting RF signals to a base station, which selects either an open-loop mode or a closed-loop mode depending on how the RF signals from the UE are changing. In the closed-loop mode, the base station periodically evaluates the RF signals from the UE and selects which of the UE's transmit antennas are to be used. This information is then sent to the UE. If the base station determines that the RF signals from the UE are changing too rapidly for effective control, then the base station selects the open-loop mode, such that the UE selects which of the UE's transmit antennas are to be used. The availability of two or more transmit antennas provides transmit diversity. Switching between transmit antennas is known as antenna switching transmit diversity (ASTD).

In one embodiment of the present invention, the UE's transmit antennas may also be used as receive antennas. In the open-loop mode, the UE may evaluate RF signals received from the base station as the basis for antenna selection. In the closed-loop mode, the UE may receive antenna selection information from a dedicated control channel, an existing control channel with spare bits, or an alternative bit definition of an existing control channel. The UE may transmit a sounding channel alternating between the UE's transmit antennas. The base station may use reception of the sounding channel from the different antennas as the basis for mode selection, antenna selection, or both. The UE may have a single transmit chain coupled to the transmit antennas through an RF switch to save cost and reduce complexity.

Figure 1:
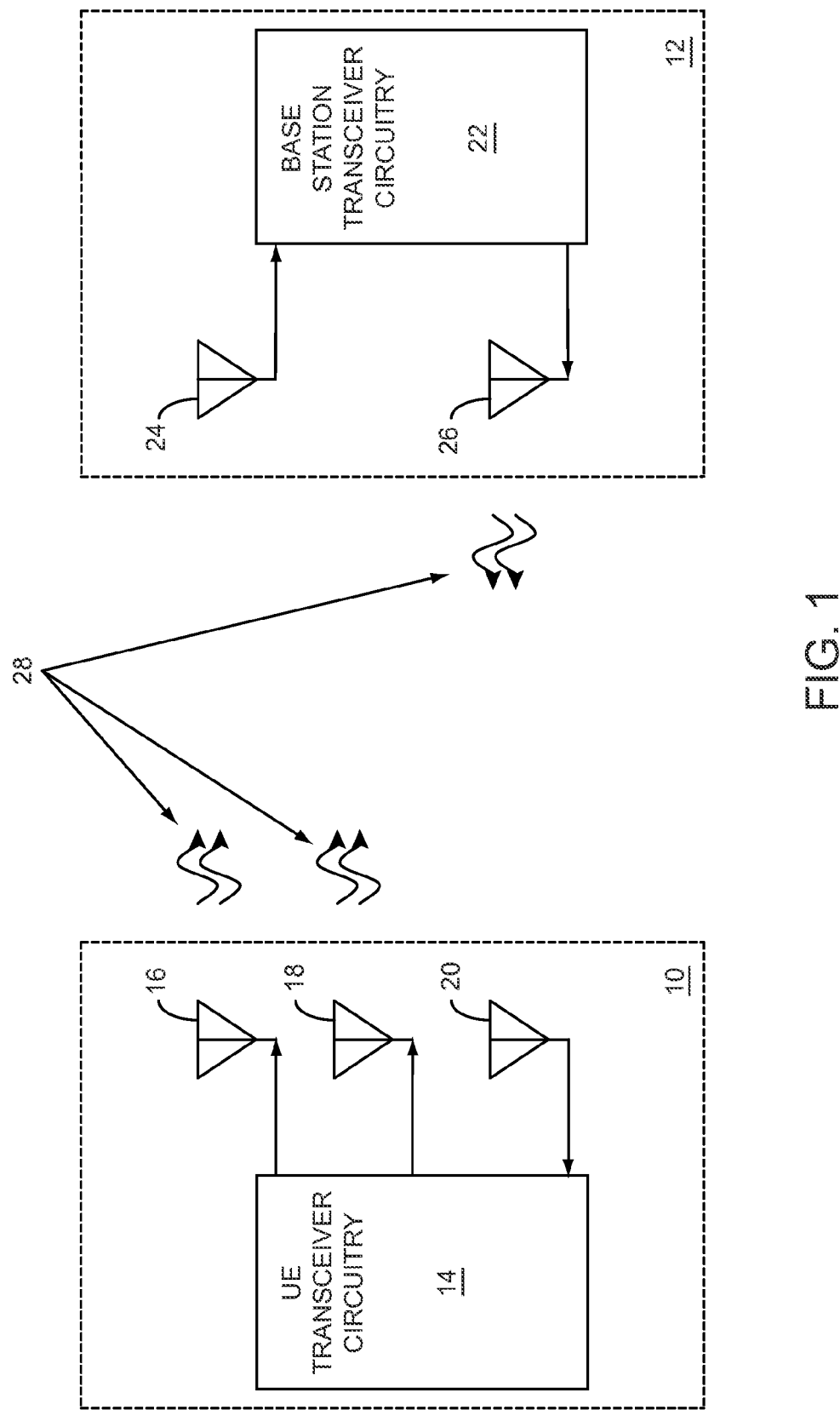
FIG. 1 shows user equipment (UE) and a base station using separate transmit and receive antennas, according to one embodiment of the present invention.

FIG. 1 shows a UE 10 and a base station 12 using separate transmit and receive antennas, according to one embodiment of the present invention. The UE 10 includes UE transceiver circuitry 14, a first UE transmit antenna 16, a second UE transmit antenna 18, and a UE receive antenna 20. The base station 12 includes base station transceiver circuitry 22, a base station receive antenna 24, and a base station transmit antenna 26. The UE transmit antennas 16, 18 transmit radiated RF signals 28 to the base station receive antenna 24, and the base station transmit antenna 26 transmits radiated RF signals 28 to the UE receive antenna 20.

The UE 10 provides a first communications link by transmitting a first RF signal from the first UE transmit antenna 16 to the base station 12, and provides a second communications link by transmitting a second RF signal from the second UE transmit antenna 18 to the base station 12. In this embodiment of the present invention, the UE 10 generally transmits from either the first UE transmit antenna 16 or the second UE transmit antenna 18, but not both UE transmit antennas 16, 18 simultaneously. The base station 12 evaluates the first and second communications links by analyzing first conditions associated with the first communications link and second conditions associated with the second communications link. The first and second conditions, also known as base station receive conditions, may be associated with receive signal strengths, receive signal integrities, or the like. The receive signal integrities may be associated with bit error rates, packet error rates, or the like.

By evaluating the first and second communications links, the base station 12 may determine which link is better. The base station 12 may select either an open-loop mode or a closed-loop mode based on the base station receive conditions. If the base station receive conditions are changing slowly enough that the base station 12 can analyze them, select which link is better, and convey that information to the UE 10, then an effective control loop may be implemented. In the closed-loop mode, the base station 12 may operate on the assumption that it can effectively track changes of the base station receive conditions. Therefore, the base station 12 may select either the open-loop mode or the closed-loop mode based on changes of the base station receive conditions. One cause of changes of the base station receive conditions is rapid movement of the UE 10, the base station 12, or both. If a velocity of the UE 10, a velocity of the base station 12, or both, is above a velocity threshold, the base station 12 may be ineffective in tracking changes of the base station receive conditions. The base station 12 may infer a velocity or other influences on channel conditions from changes of the base station receive conditions and select either the closed-loop mode if the inferred velocity is below the velocity threshold or the open-loop mode if the inferred velocity is equal to or above the velocity threshold.

The base station 12 may periodically evaluate the changes of the base station receive conditions and then select either the open-loop mode or the closed-loop mode. The time period between evaluations, called an adaptation interval, may be selected to minimize communications and processing overheads at the expense of effectiveness in changing RF environments, or vice versa. Accordingly, adaptation intervals may be varied based on inferred velocities, or the like. In a first exemplary embodiment of the present invention, the adaptation interval may exceed about one second. In a second exemplary embodiment of the present invention, the adaptation interval may be less than about one second. In a third exemplary embodiment of the present invention, the adaptation interval may exceed about 500 milliseconds. In a fourth exemplary embodiment of the present invention, the adaptation interval may be less than about 500 milliseconds. In a fifth exemplary embodiment of the present invention, the adaptation interval may exceed about 250 milliseconds. In a sixth exemplary embodiment of the present invention, the adaptation interval may be less than about 250 milliseconds.

The base station 12 may transmit first information to the UE 10. The first information is associated with which of the closed-loop mode and the open-loop mode has been selected by the base station 12. When the closed-loop mode is selected, the base station 12 may periodically evaluate the base station receive conditions and make a UE transmit antenna selection based on which of the first and second communications links is preferred. The UE transmit antenna selection is associated with second information, which may be periodically transmitted from the base station 12 to the UE 10. When the open-loop mode is selected, the base station 12 does not make UE transmit antenna selections. Nor does the base station 12 transmit second information to the UE 10.

The UE 10 operates in either the closed-loop mode or the open-loop mode based on the first information. During the closed-loop mode, the UE 10 selects either the first UE transmit antenna 16 or the second UE transmit antenna 18 based on the second information. During the open-loop mode, the UE 10 may select either the first UE transmit antenna 16 or the second UE transmit antenna 18 internally, without specific direction from the base station 12. The first and second information may be provided in a single message, or may be provided in first and second messages, respectively. Typically, the second information may be provided more often than the first information. Therefore, the second information may be provided in one layer of an open system interconnection (OSI) model and the first information may be provided in a higher layer of the OSI model.

The UE 10 may alternate between transmitting a sounding channel using the first communications link and transmitting the sounding channel using the second communications link. The base station 12 may analyze the first and second conditions based on sounding channel transmissions, which may be used during the closed-loop mode, the open-loop mode, or both. The sounding channel transmissions may be used to provide information used in selecting either the open-loop mode or the closed-loop mode, used in UE transmit antenna selection, or both. The rate of alternating between transmitting the sounding channel using the first communications link and transmitting the sounding channel using the second communications link is called a switching rate. Typically, the switching rate is constant. The switching rate may be determined by the UE 10 or may be determined by the base station 12, which may provide third information to the UE 10 specifying the switching rate. For accurate evaluation of the first and second conditions, the switching rate may be increased as the inferred velocity of the UE 10 increases.

When the closed-loop mode is selected, the base station 12 may track changes of the signal strength of the first communications link, may track changes of the signal strength of the second communications link, may track changes of the signal integrity of the first communications link, may track changes of the signal integrity of the second communications link, or any combination thereof. Alternate embodiments of the present invention may include any number of UE transmit antennas, any number of UE receive antennas, any number of base station receive antennas, any number of base station transmit antennas, or any combination thereof. Any number of communications links may be used. Each communications link may include one or more of the UE transmit antennas. In an additional embodiment of the present invention, a first communications terminal, such as a relay station, may be used in place of the UE 10, a second communications terminal, such as a relay station, may be used in place of the base station 12, or both. The first communications terminal may be functionally equivalent to the UE 10 as described herein, the second communications terminal may be functionally equivalent to the base station 12 as described herein, or both. Upon initialization and before receiving the first information from the base station 12, the UE 10 may operate in the open-loop mode as a default condition until the base station 12 sends the first information to the UE 10.

Figure 2:
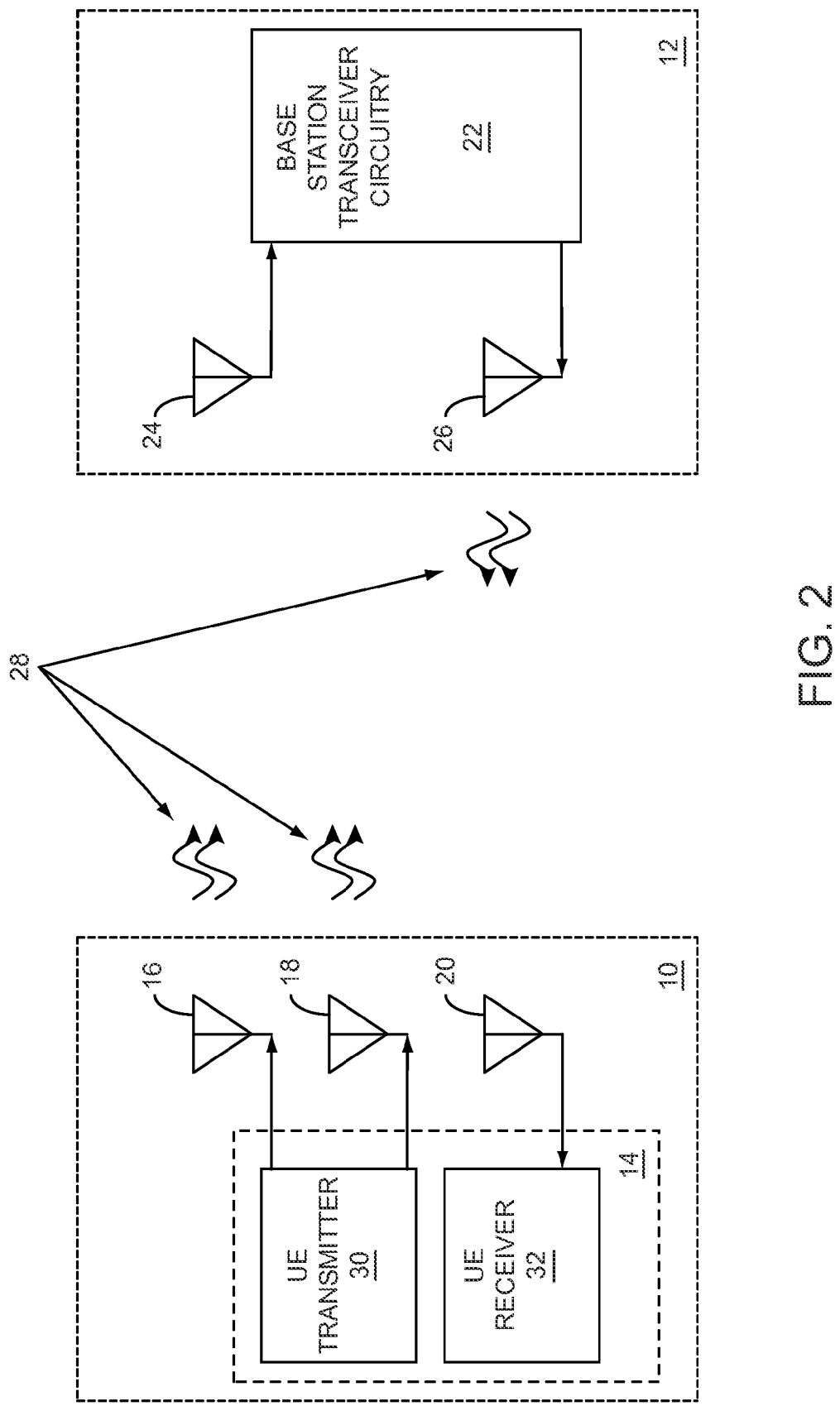
FIG. 2 shows details of UE transceiver circuitry illustrated in FIG. 1.

FIG. 2 shows details of the UE transceiver circuitry 14 illustrated in FIG. 1. The UE transceiver circuitry 14 includes a UE transmitter 30 and a UE receiver 32. The first and second UE transmit antennas 16, 18 are fed from the UE transmitter 30 and are used to transmit RF signals to the base station 12. The UE receive antenna 20 receives RF signals from the base station 12 and feeds the UE receiver 32.

Figure 3:
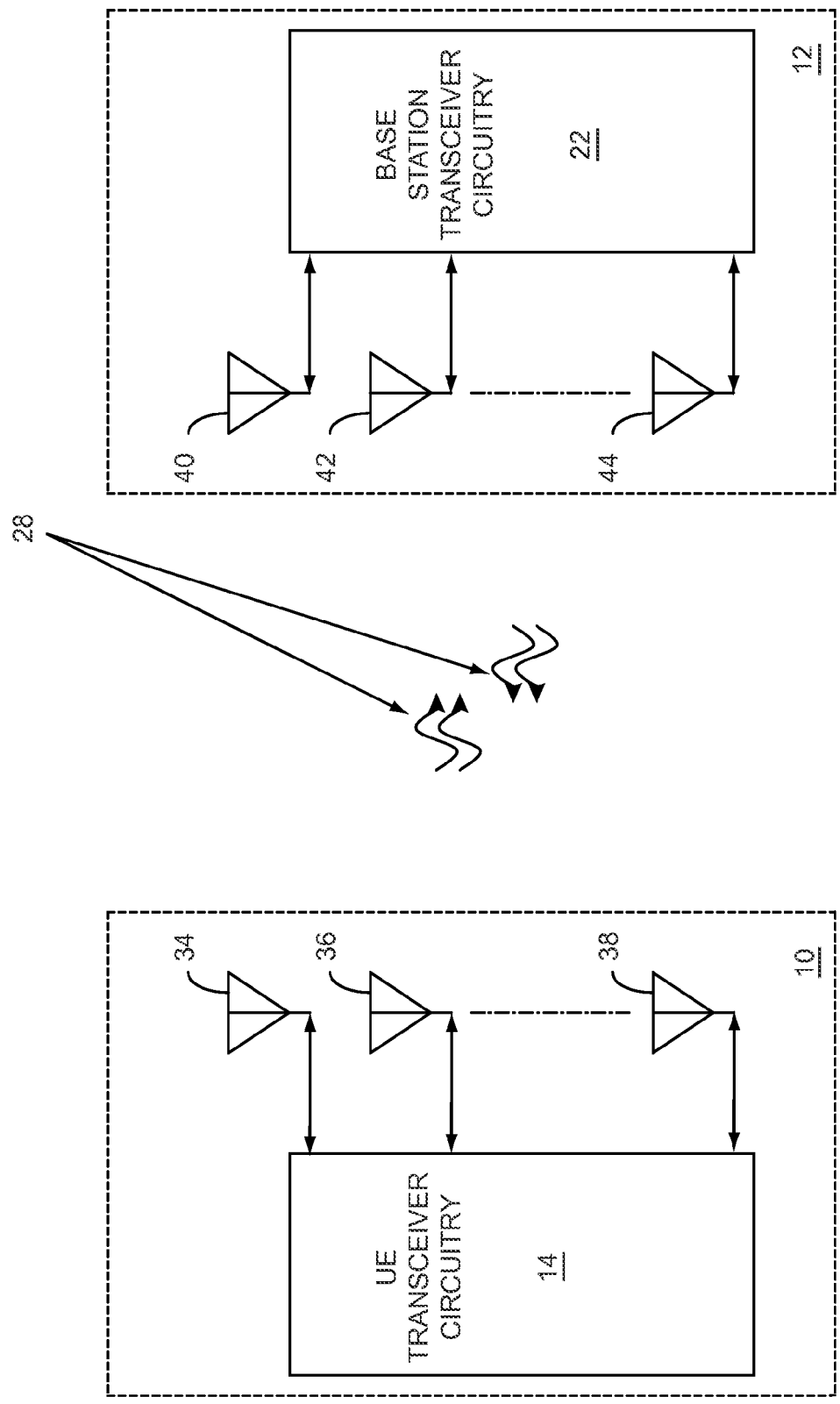
FIG. 3 shows the UE and the base station using multiple dual purpose antennas, according to an alternate embodiment of the present invention.

FIG. 3 shows the UE 10 and the base station 12 using multiple dual purpose antennas, according to an alternate embodiment of the present invention. Dual purpose antennas are used for both transmitting and receiving. The UE 10 may use dual purpose antennas instead of the separate UE transmit antennas 16, 18 and UE receive antenna 20 illustrated in FIG. 1. The base station 12 may use dual purpose antennas instead of the separate base station transmit antenna 26 and the base station receive antenna 24 illustrated in FIG. 1. The UE transceiver circuitry 14 is coupled to a first UE dual purpose antenna 34, a second UE dual purpose antenna 36, and an Nth UE dual purpose antenna 38. The UE 10 may include any number of UE dual purpose antennas. Each of the UE dual purpose antennas 34, 36, 38 may be used for transmitting only, receiving only, or both receiving and transmitting. The UE dual purpose antennas 34, 36, 38 may be grouped together in any manner to provide any number of communications links. Transmissions of a sounding channel may alternate in any manner between individual or groups of the UE dual purpose antennas 34, 36, 38. The second information may be used to select any individual or groups of the UE dual purpose antennas 34, 36, 38.

In a first exemplary embodiment of the present invention, the first UE dual purpose antenna 34 and the second UE dual purpose antenna 36 form a first antenna group, which provides the first communications link, and a third UE dual purpose antenna (not shown) provides the second communications link. In a second exemplary embodiment of the present invention, the first UE dual purpose antenna 34 provides the first communications link, the second UE dual purpose antenna 36 provides the second communications link, and the third UE dual purpose antenna (not shown) provides a third communications link.

Figure 4:
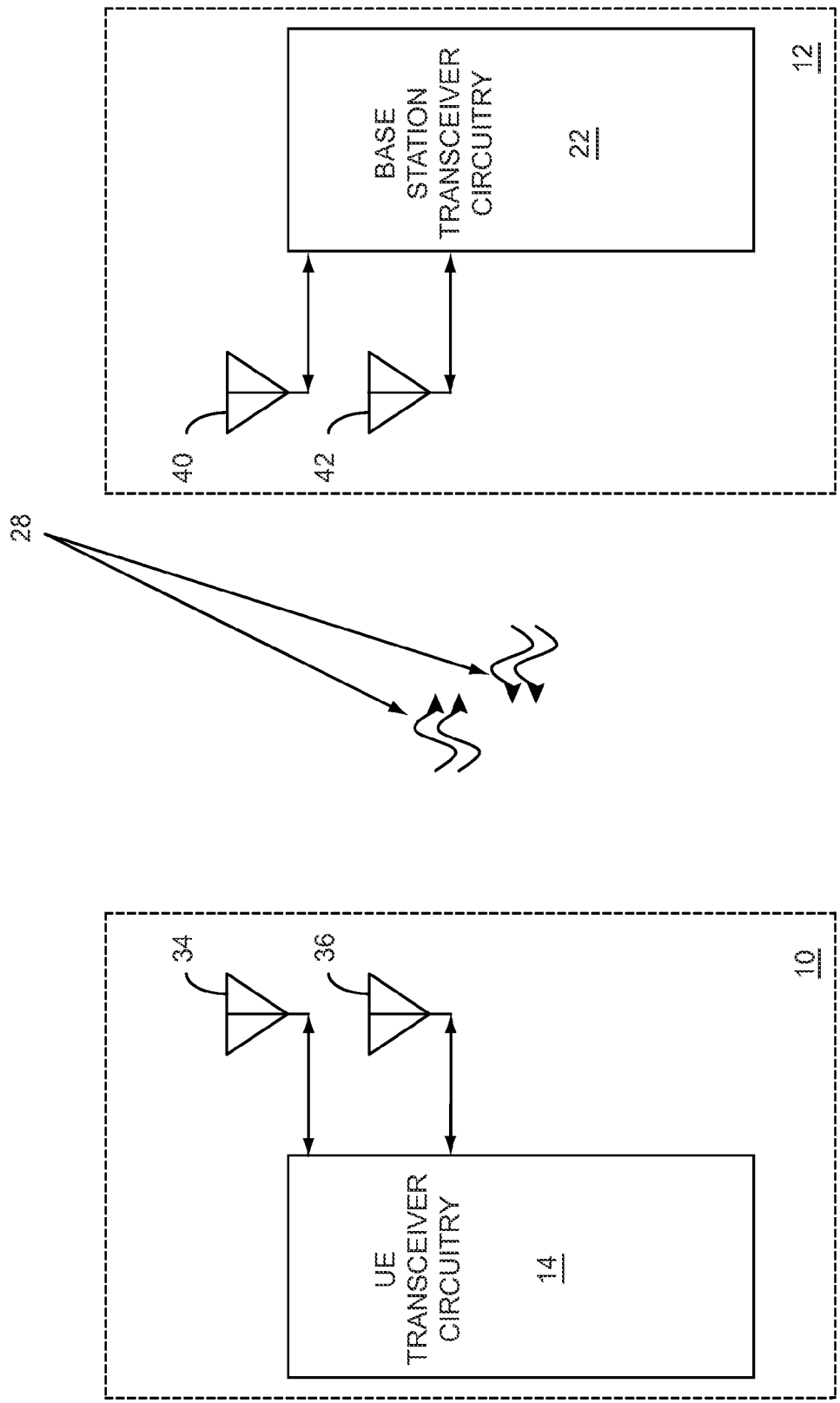
FIG. 4 shows the UE using two dual purpose antennas and the base station using two dual purpose antennas, according to another embodiment of the present invention.

The base station 22 transceiver circuitry 22 is coupled to a first base station dual purpose antenna 40, a second base station dual purpose antenna 42, and an Nth base station dual purpose antenna 44. The base station 12 may include any number of base station dual purpose antennas. Each of the base station dual purpose antennas 40, 42, 44 may be used for transmitting only, receiving only, or both receiving and transmitting. FIG. 4 shows the UE 10 using only the first and the second UE dual purpose antennas 34, 36 and the base station 12 using only the first and the second base station dual purpose antennas 40, 42, according to an additional embodiment of the present invention.

Figure 5:
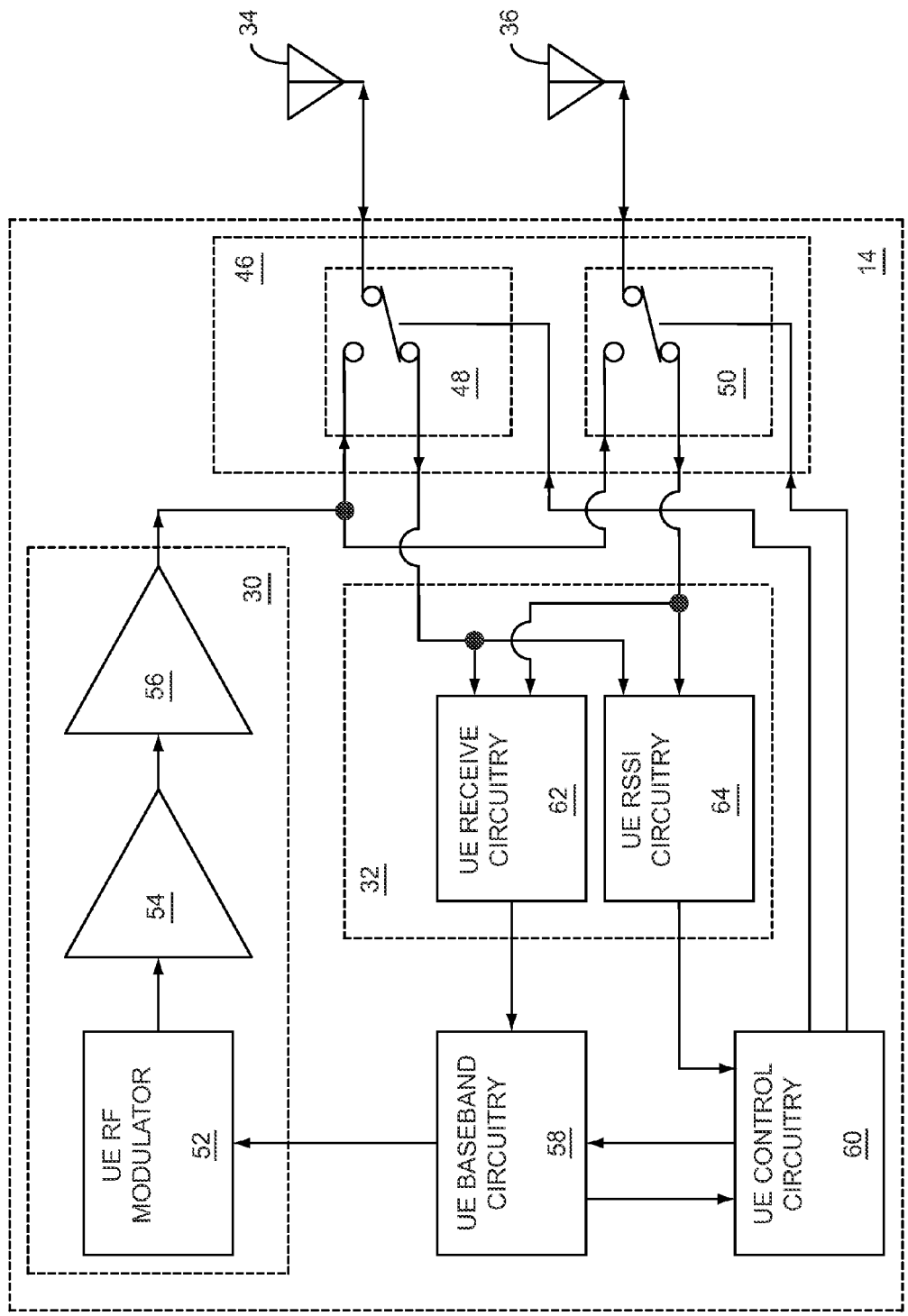
FIG. 5 shows details of the UE transceiver circuitry illustrated in FIG. 4.

FIG. 5 shows details of the UE transceiver circuitry 14 illustrated in FIG. 4. The UE transceiver circuitry 14 includes the UE transmitter 30 and the UE receiver 32 coupled to the first and the second UE dual purpose antennas 34, 36 through RF switch circuitry 46, which includes a first RF switch 48 and a second RF switch 50. The UE transmitter 30 includes a UE RF modulator 52, which RF modulates a UE baseband transmit signal to provide a UE RF transmit signal to UE driver stage circuitry 54, which amplifies the UE RF transmit signal to provide an amplified UE RF transmit signal to UE final stage circuitry 56. The UE final stage circuitry 56 provides further amplification to the amplified UE RF transmit signal to provide a final UE RF transmit signal from an output of the UE final stage circuitry 56.

The output of the UE final stage circuitry 56 is coupled to the first and second UE dual purpose antennas 34, 36 through the first and second RF switches 48, 50, respectively. Typically, the first and second RF switches 48, 50 are configured such that the output of the UE final stage circuitry 56 is coupled to either the first UE dual purpose antenna 34 or to the second UE dual purpose antenna 36, but not both simultaneously. The UE RF modulator 52, the UE driver stage circuitry 54, and the UE final stage circuitry 56 may form a single transmit chain, such that the output of the UE final stage circuitry 56 provides an output for the single transmit chain. Alternate embodiments of the present invention may include a separate transmit chain for each of the first and second UE dual purpose antennas 34, 36. Additional embodiments of the present invention may have multiple transmit chains, each with at least one output. The multiple outputs may be coupled to multiple antennas in any manner.

Additionally, the UE transceiver circuitry 14 includes UE baseband circuitry 58 and UE control circuitry 60. The UE receiver 32 receives and down converts a UE RF receive signal into a UE baseband receive signal, which is provided to the UE baseband circuitry 58, which provides the UE baseband transmit signal to the UE RF modulator 52. The UE receiver 32 is coupled to the first and the second UE dual purpose antennas 34, 36 through the first and the second RF switches 48, 50, respectively. The first and the second RF switches 48, 50 may be configured such that the UE receiver 32 is coupled to the first UE dual purpose antenna 34, to the second UE dual purpose antenna 36, or both simultaneously. Alternate embodiments of the RF switch circuitry 46 may include any combination of RF switches, or may include any combination of RF switches and duplexers, which may allow simultaneous transmission and reception of RF signals using the first UE dual purpose antenna 34, the second UE dual purpose antenna 36, or both. The UE control circuitry 60 may receive the first information, the second information, the third information, or any combination thereof, and configure the RF switch circuitry 46 accordingly. During the open-loop mode, the RF switch circuitry 46 may be disabled.

In one embodiment of the present invention, the UE receiver 32 may include UE receive circuitry 62 and UE receive signal strength indication (RSSI) circuitry 64, which may allow measurements of first UE received signal conditions and second UE received signal conditions associated with RF signals received from the base station 12 using the first and the second UE dual purpose antennas 34, 36, respectively. The first and the second UE received signal conditions may include signal strengths, signal integrities, or both. During the open-loop mode, selection of which of the first and the second UE dual purpose antennas 34, 36 is to be used for transmitting may be based on the first and the second UE received signal conditions.

Figure 6:
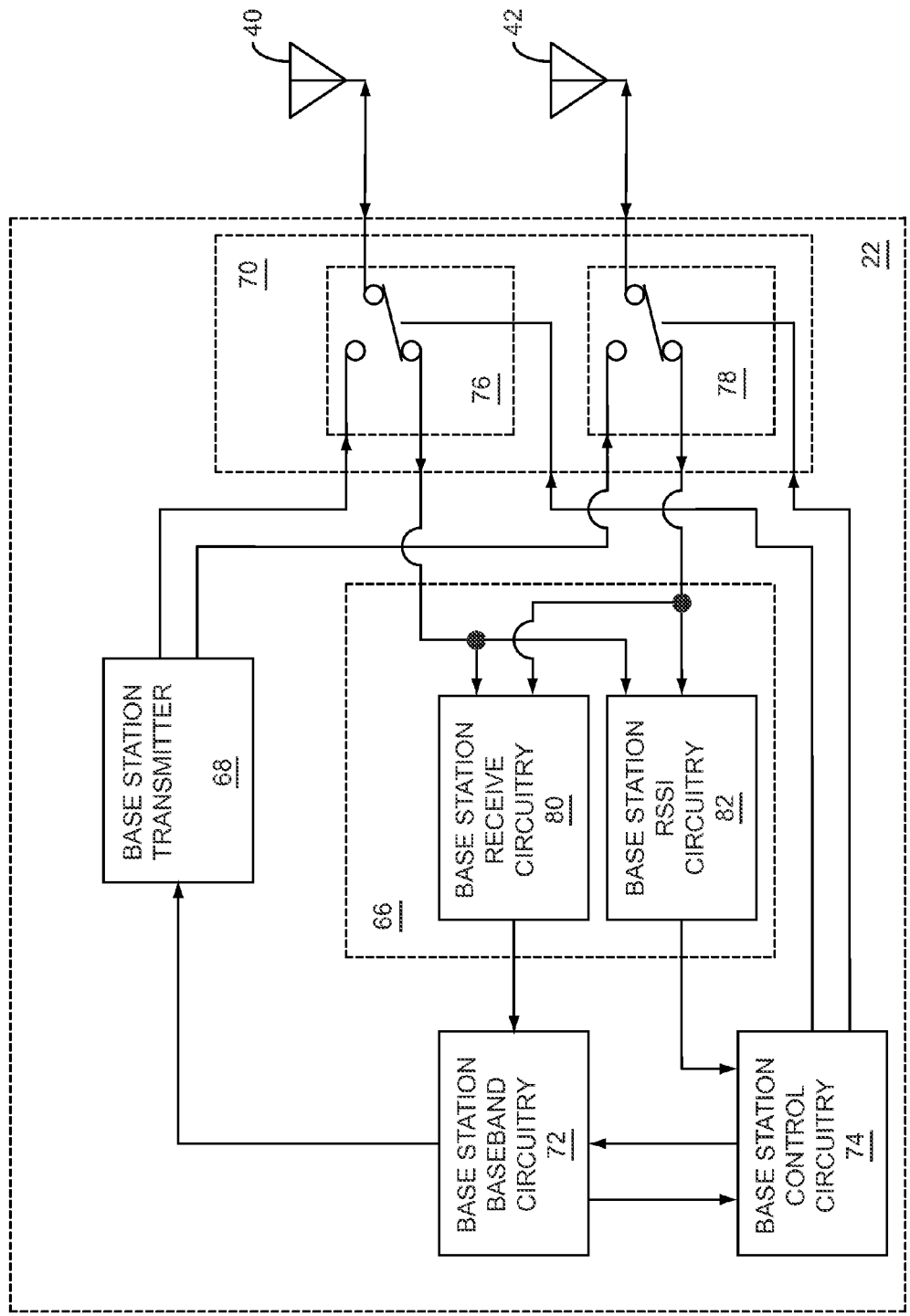
FIG. 6 shows details of base station transceiver circuitry illustrated in FIG. 4.

FIG. 6 shows details of the base station transceiver circuitry 22 illustrated in FIG. 4. The base station transceiver circuitry 22 includes a base station receiver 66 and a base station transmitter 68, both of which are coupled to the first and the second base station dual purpose antennas 40, 42 through base station RF switch circuitry 70. Additionally, the base station transceiver circuitry 22 includes base station baseband circuitry 72 and base station control circuitry 74. The base station RF switch circuitry 70 includes a first base station RF switch 76 and a second base station RF switch 78. The base station receiver 66 includes base station receive circuitry 80, which receives and down converts base station RF receive signals into base station baseband receive signals, which are provided to the base station baseband circuitry 72, and base station RSSI circuitry 82, which measures the signal strength of the base station RF receive signals. The base station baseband circuitry 72 provides a base station baseband transmit signal to the base station transmitter 68 for RF modulation, amplification, and transmission. The base station receive circuitry 80 and the base station RSSI circuitry 82 provide information associated with the first conditions and the second conditions to the base station control circuitry 74, which analyzes the conditions and selects either the closed-loop mode or the open-loop mode, selects the appropriate UE transmit antenna, infers the velocity of the UE, and the like. The base station control circuitry 74 provides the first information, the second information, the third information, or any combination thereof, to the base station baseband circuitry 72 as needed for transmission to the UE 10.

Figure 7:
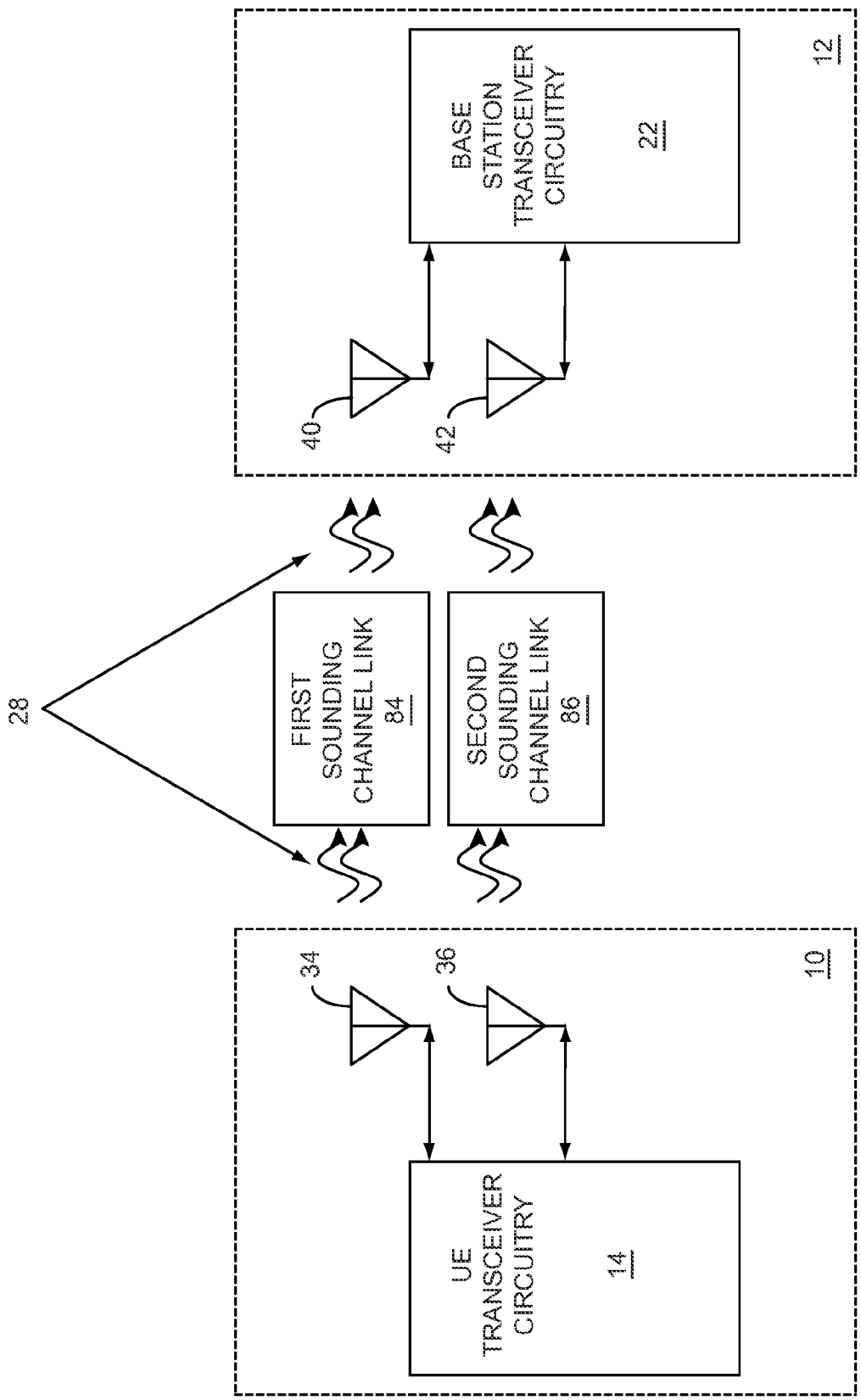
FIG. 7 shows the UE and the base station illustrated in FIG. 4 using a first sounding link and a second sounding link, according to one embodiment of the present invention.

FIG. 7 shows the UE 10 and the base station 12 illustrated in FIG. 4 using a first sounding channel link 84 and a second sounding channel link 86, according to one embodiment of the present invention. The UE 10 may alternate between transmitting a sounding channel using the first sounding channel link 84 over the first communications link and transmitting the sounding channel using the second sounding channel link 86 over the second communications link. The base station 12 may analyze the first conditions and the second conditions based on sounding channel transmissions, which may be used during the closed-loop mode, the open-loop mode, or both. The sounding channel transmissions may be used to provide information used in selecting either the open-loop mode or the closed-loop mode, may be used in UE transmit antenna selection, or both.

Figure 8:
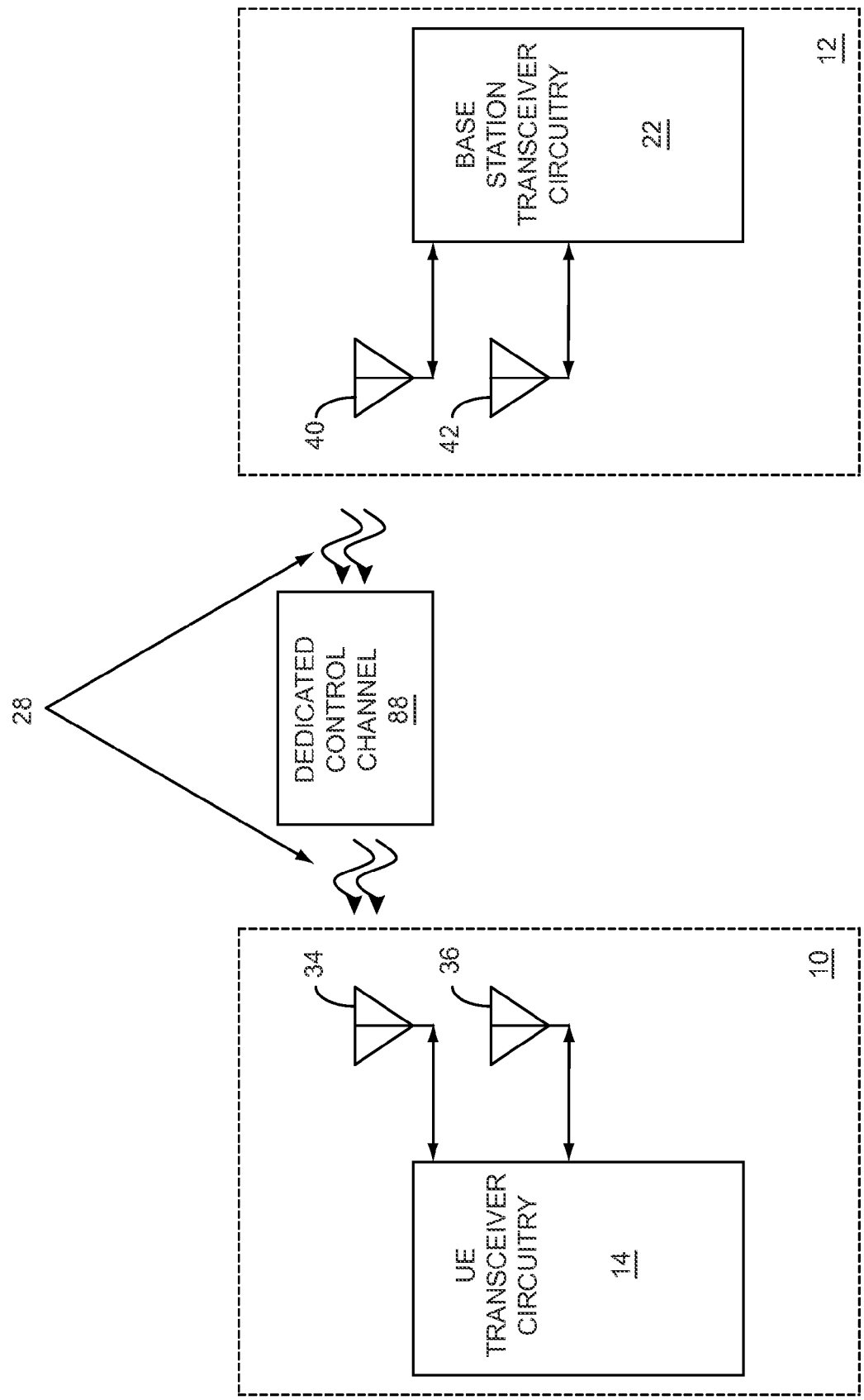
FIG. 8 shows the UE and the base station illustrated in FIG. 4 using a dedicated control channel, according to one embodiment of the present invention.

FIG. 8 shows the UE 10 and the base station 12 illustrated in FIG. 4 using a dedicated control channel 88, according to one embodiment of the present invention. The base station 12 may provide the first information, the second information, the third information, or any combination thereof, to the UE 10 using the dedicated control channel 88. When the closed-loop mode is selected, the dedicated control channel 88 may include a single-bit control channel to provide the second information. One drawback of using the dedicated control channel 88 may be a need for additional communications bandwidth to support the dedicated control channel 88.

Figure 9:
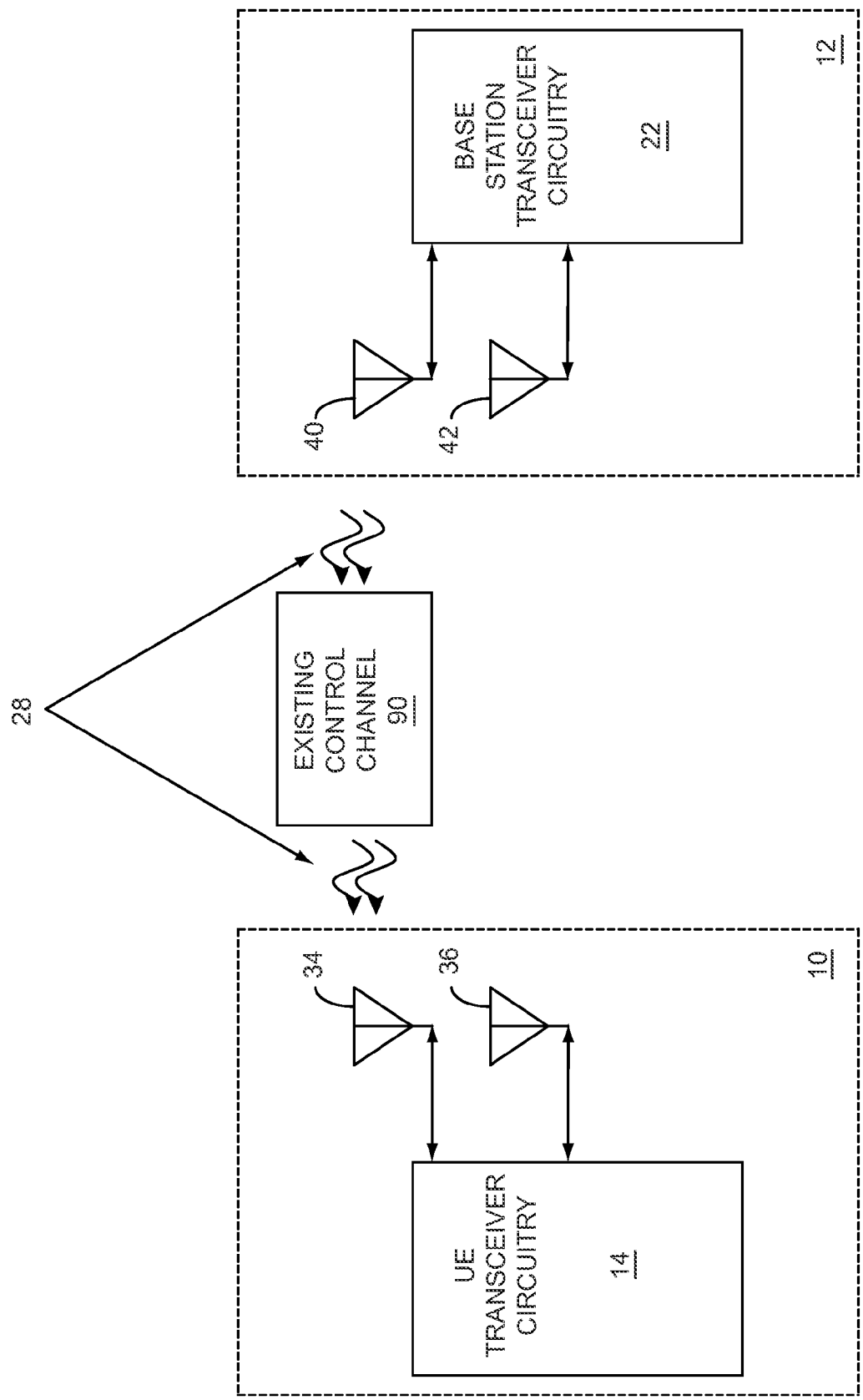
FIG. 9 shows the UE and the base station illustrated in FIG. 4 using an existing control channel, according to an alternate embodiment of the present invention.

FIG. 9 shows the UE 10 and the base station 12 illustrated in FIG. 4 using an existing control channel 90, according to an alternate embodiment of the present invention. The base station 12 may provide the first information, the second information, the third information, or any combination thereof, to the UE 10 using the existing control channel 90. Using the existing control channel 90 may be particularly advantageous if unused bits are available. If no unused bits are available, it may be possible to use alternative bit definitions of the existing control channel 90.

Figure 10:
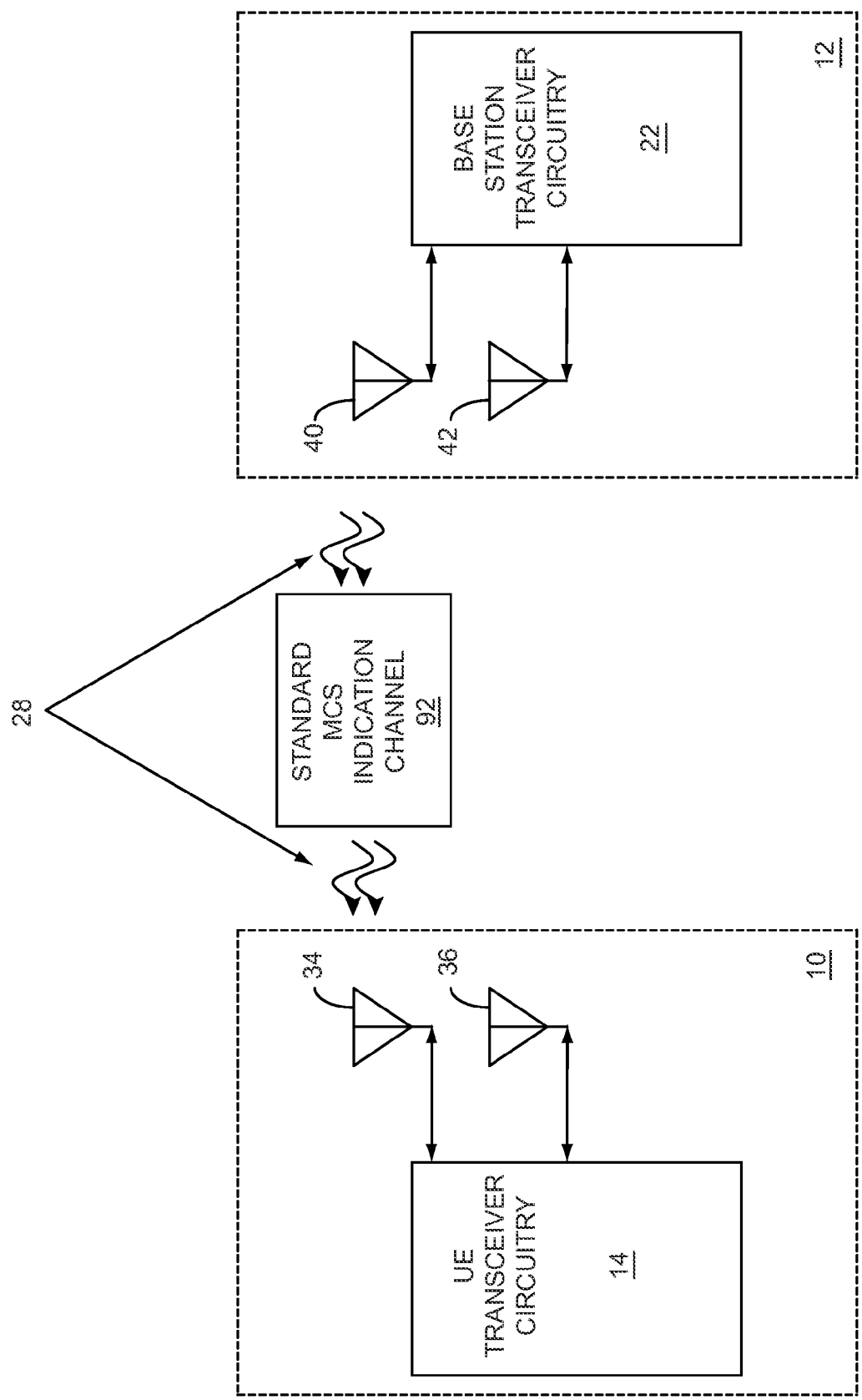
FIG. 10 shows the UE and the base station illustrated in FIG. 4 using a standard modulation coding set (MCS) indication channel during an open-loop mode, according to an additional embodiment of the present invention.

FIG. 10 shows the UE 10 and the base station 12 illustrated in FIG. 4 using a standard modulation coding set (MCS) indication channel 92 during the open-loop mode, according to an additional embodiment of the present invention. Some communications protocols use the standard MCS indication channel 92 in assigning resource units to communications trunks. During the open-loop mode, use of the standard MCS indication channel 92 works effectively; however, during the closed-loop mode, the base station 12 must periodically transmit the second information, which includes antenna selection information, to the UE 10. Therefore, to provide the second information without increasing the amount of data transferred by the control channel, alternative bit definitions of the MCS channel may be used.

Figure 11:
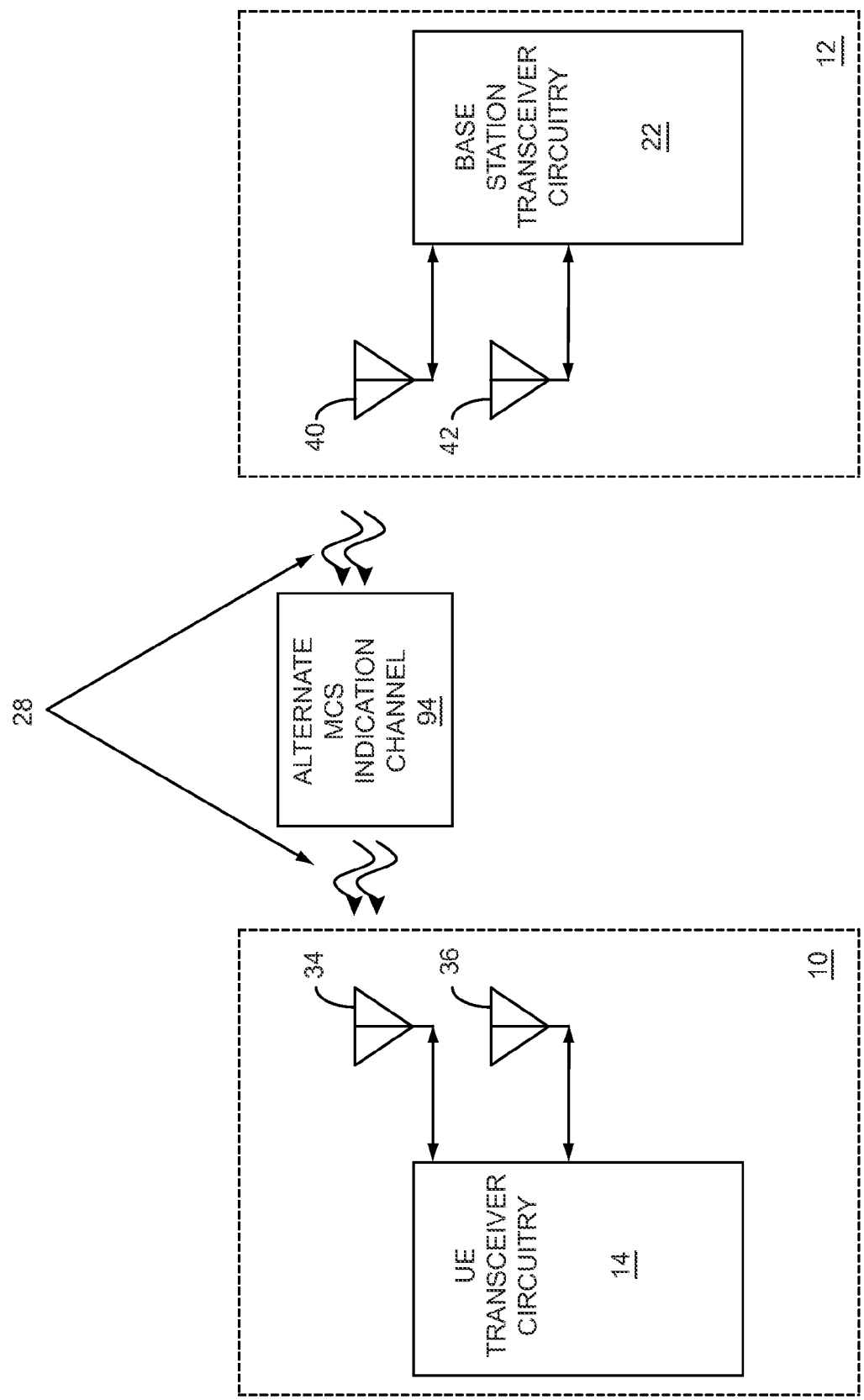
FIG. 11 shows the UE and the base station illustrated in FIG. 4 using an alternate MCS indication channel during a closed-loop mode, according to the additional embodiment of the present invention.

FIG. 11 shows the UE 10 and the base station 12 illustrated in FIG. 4 using an alternate MCS indication channel 94 during the closed-loop mode, according to the additional embodiment of the present invention. The base station 12 may provide the second information to the UE 10 using the alternate MCS indication channel 94, which has the same number of bits as the standard MCS indication channel 92; however, by using an efficient alternate coding scheme, the alternate MCS indication channel 94 may provide needed MCS information and antenna selection information.

FIGS. 12A and 12B show an example of details of the standard MCS indication channel 92 and the alternate MCS indication channel 94, respectively. Different protocols may use a different number of bits to indicate an MCS level 96. In the example shown, the MCS level 96 has five bits, which include MCS bit zero 98, MCS bit one 100, MCS bit two 102, MCS bit three 104, and MCS bit four 106. The five MCS bits 98, 100, 102, 104, 106 may define 32 different MCS levels. However, in some communications protocols, changes between MCS levels from two consecutive MCS packets to a selected UE 10 may not change more than plus or minus seven MCS levels. Therefore, the MCS level 96 may be represented as an offset between consecutive MCS packets to a selected UE 10. The offset may be represented by an MCS offset 108, which includes MCS bit zero 98, MCS bit one 100, and MCS bit two 102. These three bits can represent an offset as high as seven levels. An MCS sign 110, which includes MCS bit three 104, represents the sign of the MCS offset 108. By representing the MCS level 96 with only four bits instead of five, MCS bit four 106 is available for another function. In the example shown, MCS bit four 106 is an antenna selection bit 112, which is sent by the base station 12 and received by the UE 10 during the closed-loop mode to select an antenna for transmitting.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A first communications terminal comprising:
   a plurality of antennas; and
   transceiver circuitry associated with the plurality of antennas and configured to:
      receive first information and second information from a base station via at least one message, wherein the first information indicates to the first communications terminal which of a closed-loop mode and a open-loop mode to select;
      select a mode for communications with the base station based on the first information, wherein during the closed-loop mode, at least one of the plurality of antennas for transmitting is selected based on the second information;
      provide a first communications link for transmissions from the first communications terminal to the base station using at least a first antenna of the plurality of antennas, wherein first conditions are associated with the first communications link;
      provide a second communications link for transmissions from the first communications terminal to the base station using at least a second antenna of the plurality of antennas, wherein second conditions are associated with the second communications link, wherein the first information and the second information are based on the first conditions and the second conditions;
      receive third information from the base station; and
      alternate between transmitting a sounding channel to the base station using the first communications link and transmitting the sounding channel to the base station using the second communications link, wherein at least one of the first conditions and the second conditions is associated with the alternating, and wherein the alternating switches at a switching rate that is based on the third information,
   wherein the second information is in one layer of an open system interconnection model and the first information is in a higher layer of the open system interconnection model relative to the one layer, and
   wherein the first communications terminal is configured to receive the second information via a dedicated control channel.

2. The first communications terminal of claim 1 wherein the first information and the second information are provided by a single message.

3. The first communications terminal of claim 1 wherein the first information is provided by a first message and the second information is provided by a second message.

4. The first communications terminal of claim 1 wherein the transceiver circuitry comprises at least one transmit chain coupled to the plurality of antennas.

5. The first communications terminal of claim 4 further comprising a radio frequency switch coupled between at least one output of the at least one transmit chain and the plurality of antennas.

6. The first communications terminal of claim 5 wherein during the open-loop mode, the radio frequency switch is disabled.

7. The first communications terminal of claim 1 wherein the plurality of antennas consists of a first antenna and a second antenna, and the at least one of the plurality of antennas for transmitting based on the second information consists of one of the first antenna and the second antenna.

8. The first communications terminal of claim 1 wherein:
   during the closed-loop mode, antenna selection is based on information received periodically from the base station; and
   during the open-loop mode, antenna selection is not based on information received periodically from the base station.

9. The first communications terminal of claim 1 wherein the transceiver circuitry is further configured to:
   determine first conditions associated with receiving a first radio frequency signal from the base station using at least a first of the plurality of antennas;
   determine second conditions associated with receiving a second radio frequency signal from the base station using at least a second of the plurality of antennas; and
   during the open-loop mode, select at least one of the plurality of antennas for transmitting based on the first conditions and the second conditions.

10. The first communications terminal of claim 1, wherein the first communication terminal is further configured to receive the second information via alternative bit definitions of an existing control channel.

11. The first communications terminal of claim 10 wherein the alternative bit definitions of the existing control channel comprise alternative bit definitions of a modulation coding set indication channel.

12. The first communication terminal of claim 1 wherein the first information is further based on at least one of changes of the first conditions and changes of the second conditions.

13. The first communications terminal of claim 12 wherein the at least one of changes of the first conditions and changes of the second conditions is based on a velocity associated with the first communications terminal, and the open-loop mode is selected if a magnitude of the velocity exceeds a velocity threshold.

14. The first communication terminal of claim 1 wherein:
   the first conditions associated with the second information are based on at least one of signal strength of the first communications link and signal integrity of the first communications link; and the second conditions associated with the second information are based on at least one of signal strength of the second communications link and signal integrity of the second communications link.

15. The first communications terminal of claim 14 wherein the second information is further based on tracking at least one of:
- changes of the signal strength of the first communications link;
- changes of the signal strength of the second communications link;
- changes of the signal integrity of the first communications link; and
- changes of the signal integrity of the second communications link.

16. The first communication terminal of claim 1 wherein the third information is based on a velocity associated with the first communications terminal.

17. The first communications terminal of claim 1 wherein the transceiver circuitry is further configured to operate in the open-loop mode after initialization and before receiving the first information from the base station.

18. A method comprising:
- providing, using a first communications terminal, a plurality of antennas;
- receiving, using the first communications terminal, first information and second information from a base station, the receiving second information comprising receiving the second information via a dedicated control channel;
- selecting, using the first communications terminal, a mode for communications from a closed-loop mode and an open-loop mode based on the first information, wherein during the closed-loop mode, at least one of the plurality of antennas for transmitting is selected based on the second information;
- receiving third information from the base station; and
- responsive to receiving the third information from the base station, switching, using the first communications terminal, transmission of a sounding channel to the base station between a first and second communication link to the base station, the switching based on the third information, the first communications link utilizing a first set of antenna of the plurality of antenna and the second communications link utilizing a second set of antenna of the plurality of antenna.

19. A communications terminal comprising:
a plurality of antennas; and
transceiver circuitry associated with the plurality of antennas and configured to:
- receive first information, second information, and third information by way of a base station and via at least one message;
- select a mode for communications with the base station from a closed-loop mode and an open-loop mode based on the first information, wherein during the closed-loop mode, at least one of the plurality of antennas is selected for transmitting based on the second information; and
- switch, using the first communications terminal, transmission of a sounding channel to the base station between a first and second communication link to the base station, the switching based on the third information,
wherein the first communications link utilizes a first set of antenna of the plurality of antenna and the second communications link utilizes a second set of antenna of the plurality of antenna,
wherein the second information is in one layer of an open system interconnection model and the first information is in a higher layer of the open system interconnection model relative to the one layer, and
wherein the communications terminal is configured to receive the second information via a dedicated control channel.

20. The method of claim 18 further comprising:
during open-loop mode:
- receiving at least one Radio Frequency (RF) signal from the base station;
- measuring the least one RF signal to determine at least one signal condition; and
- selecting at least one antenna of the plurality of antenna based, at least in part, on the at least one measured signal condition.

21. The method of claim 20, wherein the at least one signal condition comprises at least one of: a signal strength; or a signal integrity.

22. The method of claim 18 further comprising:
receiving at least one of the first information, the second information, and the third information via unused bits associated with an existing control channel.

* * * * *